UNITED STATES PATENT OFFICE.

DUANE HULL, OF NEWBURG, NEW YORK.

IMPROVEMENT IN EXTRACTING ROSIN AND OTHER SUBSTANCES FROM PINE WOOD.

Specification forming part of Letters Patent No. 44,314, dated September 20, 1864.

*To all whom it may concern:*

Be it known that I, DUANE HULL, of Newburg, in the county of Orange and State of New York, have made a new and useful Improvement in Extracting Rosin and other Substances from Pine Wood; and I hereby declare that the following is a full, and exact description of the same.

It has long been known that trees of the pine family contain a number of useful products ready formed in the wood in its natural state. The common yellow pine, pitch-pine, and other nearly allied varieties of the pine family are very rich in some of these products, particularly rosin and spirits of turpentine. Such parts of these trees as is commonly called "fat-pine" contain the largest amount of these substances. Besides what I have above described as natural products, other products have been derived from pine wood by destructive distillation, what I call "artificial products," such as tan-wood, naphtha, pyroligneous acid, creosote, hydrocarbon gases, and a large number of substances which may be found described in works which treat of the destructive distillation of wood. These substances do not exist ready-formed in the wood, but result from the breaking up of the natural proximate element of the wood. My invention does not relate to the production of these artificial products, though some of them, as will hereinafter appear, may be very conveniently produced in connection with the production of the substances which are the immediate objects of my invention.

The substance commonly known as "rosin" has, previous to my invention, been obtained by distilling turpentine, which is the resinous product of the pine-tree, obtained by "boxing," as it is called, the living tree. At the proper season of the year a notch or box is cut in the tree and the bark removed around and near the box, and the turpentine which exudes is collected and by distillation is separated into the well-known products of rosin and spirits of turpentine.

The object of my invention is to obtain rosin directly from pine wood by a process of gentle distillation. By the same operation spirits of turpentine, or a substance which I believe to be spirits of turpentine, is also obtained in a better manner than it has been obtained heretofore by the distillation of wood.

To enable others skilled in the art to use my invention, I proceed to describe it.

I take a suitable still (such as is used for distilling petroleum will answer) and place in it in an upright position pieces of pine wood, cut and split so as to be about the size of kindling-wood. I then inject into the still, so as to thoroughly envelop every piece of the wood, a blast of heated air or a jet of superheated steam. I prefer to use heated air. The air may be heated in apparatus such as is well known for heating hot-blast in foundries and iron-works. A common fan-blower will answer for driving the air through the tubes for heating the air and through the still; but any equivalent blowing-machine may be used, as found most convenient. Very soon after the hot-blast enters the still, if the wood is fat, the resinous substances contained in it begin to exude and are at once separated into two portions—namely, rosin, which runs down to the bottom of the still, and spirits of turpentine, which is carried over by the blast. By conveying the outgoing blast through a condenser the spirits of turpentine is condensed and collected, while the rosin in the bottom of the still is drawn off by a pipe and stop-cock. Care is necessary in regulating the temperature of the air-blast or steam-jet, since it must not be such as to produce destructive distillation, but only hot enough to drive out of the pores of the wood the resin they contain. By observing the products which come from the still any overheating may be easily detected. The water contained naturally in the wood serves to keep down the temperature in the early part of the operation.

When I wish to manufacture rosin and turpentine in considerable quanties I prefer to use a still, oven, or retort different from the ordinary oil-still. I construct a square or rectangular tank with an inverted pyramidal bottom, to hold at least a half a cord of wood at a charge, with an opening on one side closed with a door. The wood is placed on a truck with a grated floor, and the sides, except the standards, of wire. The loaded truck is then moved into the oven or retort and the door closed and luted in the manner known in distilling coal. The hot-air blast or steam-jet is then driven into the oven and the distillation proceeds, as above stated. As soon as all the resinous matters have been expelled from the wood, except such as require heat sufficient to produce destructive distillation, it is best to discontinue the heat, open the door, and remove the truck. The wood may then be run out and into another oven or retort and subjected to distillation at high temperature, and another series of products—such as tar, wood-vinegar, and charcoal—be obtained. By this arrangement the first oven or retort and condenser will not be coated or fouled with tar, creosote, &c.

A convenient form of condenser is formed by two concentric cylinders of sheet metal, with a space of about two inches between; or when steam is used an ordinary oil-condenser will answer; but when hot air is used the large amount of air which passes through the condenser makes it necessary that both the diameter of the goose-neck of the oven or retort and the cross-section of the ways in the condenser should be large.

When the distillation is conducted as herein described the turpentine collected will be found to be free from tar and requires but little trouble in rectifying and purifying, whereas when it has been attempted to distill pine wood by the application of the fire to the retort the result has been that no rosin has been obtained, but only tar in the bottom of the retort, and the turpentine itself is dark-colored and of disagreeable odor, requiring much trouble to rectify and purify it; but by applying the heat through the medium of air or steam, as I do, all parts of the still are heated equally, and there are no overheated parts to decompose the rosin and turpentine, as is the case when the fire is placed under and around the still.

I have described the mode which I deem best in carrying out my invention; but I do not wish to confine myself to the use of the apparatus described, as a great variety of stills, retorts, and ovens may be adapted to the purpose of my invention.

I do not claim as my invention the use of hot air or superheated steam for effecting distillation, since I am aware that both hot air and superheated steam have been used in the destructive distillation of wood, as in the manufacture of tar, wood-vinegar, wood-spirits, wood-gas, and charcoal. Nor do I claim making turpentine from wood when the heat is applied only to the outside of the still, oven, or retort, as that has been done by myself and others before the date of my present invention.

Having thus described my invention, what I claim, and desire to secure by Letters Patent of the United States, is—

The art of producing rosin direct from pine wood by the application of heated air or superheated steam, as above described, and the improved mode of producing spirits of turpentine by means of hot air or superheated steam, as above described.

DUANE HULL.

Witnesses:
 JNO. B. J. FENTON,
 CHARLES CALDWELL.